United States Patent [19]

Andersson et al.

[11] 4,116,377
[45] Sep. 26, 1978

[54] MIXER UNIT WITH THERMOSTAT-CONTROLLED VALVES

[75] Inventors: Maj Andersson, Stockholm; Gunnar Lagher, Fjälkinge, both of Sweden

[73] Assignee: Maj Andersson Arkitektkontor AB, Stockholm, Sweden

[21] Appl. No.: 767,689

[22] Filed: Feb. 11, 1977

[30] Foreign Application Priority Data

Feb. 16, 1976 [SE] Sweden ............................... 7601682

[51] Int. Cl.² ............................................. G05D 11/16
[52] U.S. Cl. ........................... 236/12 A; 236/101 A; 251/43
[58] Field of Search ............... 236/12 R, 12 Q, 12 A, 236/101 A; 137/90, 636; 251/43, 38

[56] References Cited

U.S. PATENT DOCUMENTS

| | | | |
|---|---|---|---|
| 2,839,247 | 6/1958 | Jorgensen | 236/12 A |
| 2,959,390 | 11/1960 | Wyss | 251/43 |
| 3,365,129 | 1/1968 | von Platen et al. | 236/12 |
| 3,489,347 | 1/1970 | Egli | 236/12 A |
| 3,884,258 | 5/1975 | Mull | 236/12 R |

Primary Examiner—William E. Wayner
Attorney, Agent, or Firm—Toren, McGeady and Stanger

[57] ABSTRACT

A mixer unit with thermostat controlled valves for mixing hot and cold liquid includes a housing with valves for supplying the hot and cold liquid to the housing. The housing includes a mixing chamber which terminates in a discharge spout. A yoke is rockably mounted in the housing and the ends are arranged to make contact with and actuate the valves for the hot and cold liquid. A bimetallic spiral control thermostat is carried in the discharge spout and cooperates with the yoke for causing rocking movement of the yoke when the thermostat spirally moves in response to regulation of the thermostat. A device is carried at the outer end of the discharge spout for adjusting the position of the spiral of the thermostat about its axis of symmetry and thereby regulating the desired temperature of the mixed liquid.

6 Claims, 6 Drawing Figures

MIXER UNIT WITH THERMOSTAT-CONTROLLED VALVES

BACKGROUND OF THE INVENTION

This invention relates to a mixer unit in which the opening relationship between valves for cold and hot liquid respectively is regulated by a bimetal spiral which causes rocking movement of a yoke to actuate the valves.

Thermostat-controlled mixer units of various kinds, usually for water, are previously known. There are in existence mixer valves with bellow thermostats, with thermostats of bimetal strips and with sleeve-shaped thermostats made of materials having a coefficient of expansion different to that of the surrounding mixer housing.

Known thermostatic mixers are as a rule relatively large owing to the fact that the actual thermostats must be of a certain length in order to be capable of moving by an amount necessary to adjust the valves within the temperature range concerned.

SUMMARY OF THE INVENTION

The purpose of this invention is to enable the production of a mixer unit with good temperature stability in the mixed medium within a range embraced by that of conventional hand-operated mixer valves. In order to achieve this purpose, the thermostat employed is designed as a double spiral made of two noncorroding metals placed in the discharge spout of the mixer unit. Hereby the spiral continuously senses the temperature of the mixed liquid, and, since the two metals in the spiral have different longitudinal coefficients of expansion, the spiral tends to open or unwind as the temperature increases and to close or wind up as the temperature decreases. Fixed to the inner end of the spiral is a yoke which rocks with the turning motion of the spiral, the opposite ends of this yoke moving pistons towards their closed position in the valves for hot and cold liquid respectively. At the outer end of the spiral located in the discharge spout a device is arranged for adjusting the position of the spiral about its axis of symmetry and thereby regulating the desired temperature of the mixed liquid. Flow control for the mixer is accomplished by means of a knob fixed to a rising spindle passing through and emerging from the upper section of the mixer housing. By adjusting this knob the position of the spindle is changed and with it the height of a ball stud at its lower end. The above-mentioned yoke rocks on this ball stud and as the height of the yoke above the valve increases, greater movement above the seats of the pistons in the valve acting as cones is permitted, whereby an increasing flow through the mixer is obtained.

The pistons, which are free to move in the cylindrical valves are drilled out centrally and so shaped that their movements are facilitated by servo forces attained. The aforementioned drilled holes continue through constrictions in the crowns of the pistons. The ends of the yoke, which rest against the crowns of the pistons when the valves are closed, are provided with rubber inserts at their points of contact with the valves to ensure a good seal against the holes in the piston crowns.

BRIEF DESCRIPTION OF THE DRAWINGS

With reference to the appended drawing, a version of the invention intended as a water mixer will be described in greater detail. Among the figures on the drawing.

DESCRIPTION OF THE INVENTION

Figure 1:
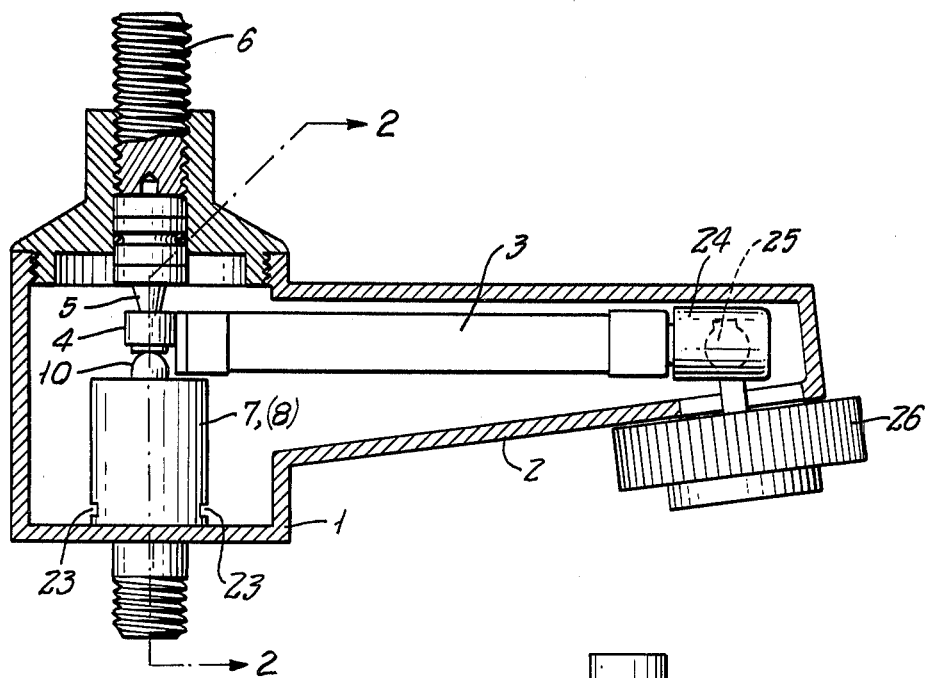
FIG. 1 is a cross-sectional view taken through the mixer housing and its discharge spout in a vertical plane through the longitudinal axis of the latter.
Figure 2:
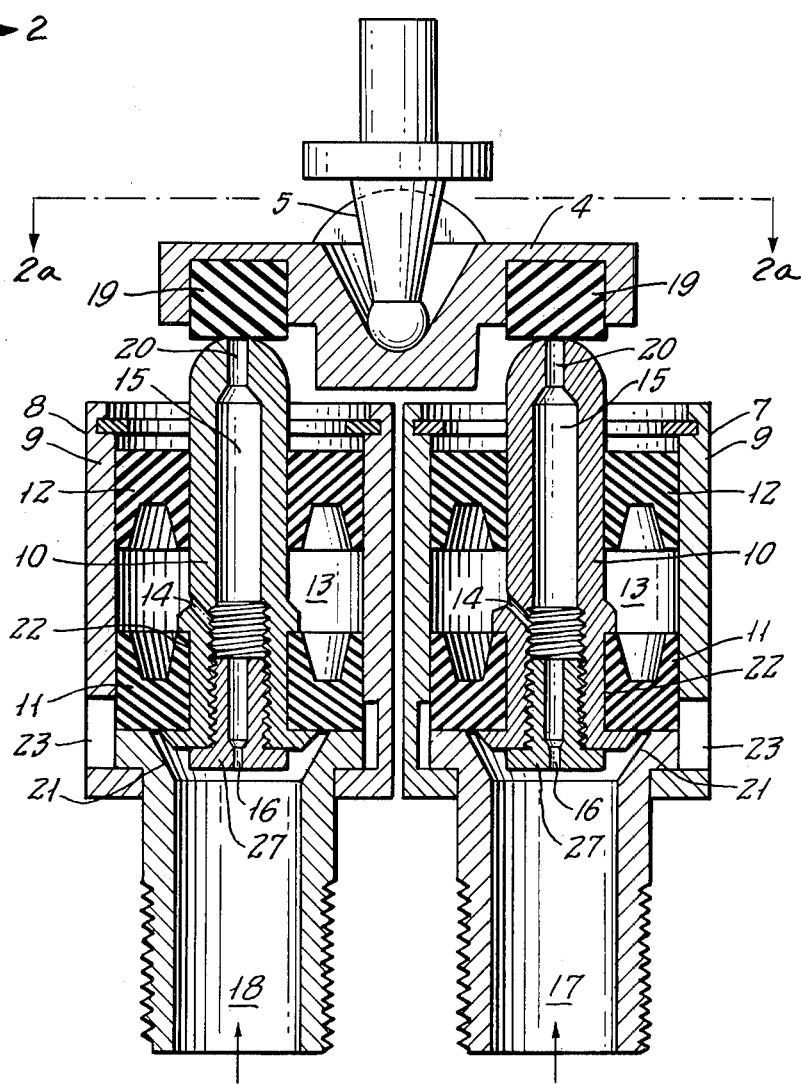
FIG. 2 is a cross-sectional view through the two valves, here intended for hot and cold water, taken at right angles to the one shown in FIG. 1 along lines A—A in FIG. 1.
Figure 2A:
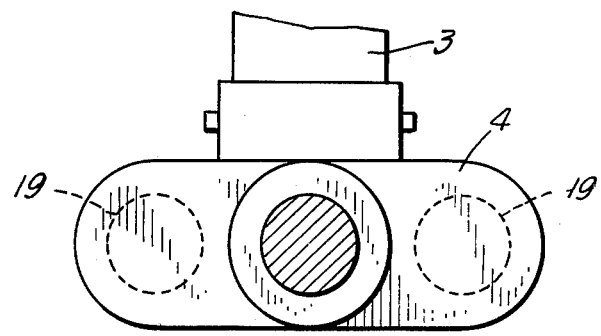
FIG. 2a is an overhead view of the valves and its position taken along lines II-II in FIG. 2.
Figure 3:
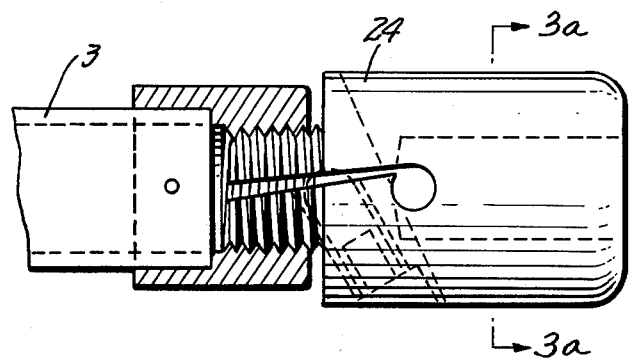
FIG. 3 is a detailed view of the end of the bimetal spiral located close to the mouth of the discharge spout with part of a transfer device.
Figure 3A:
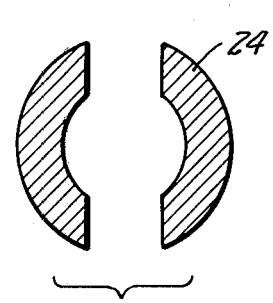
FIG. 3a is a cross-sectional view taken along lines III-III in FIG. 3.
Figure 4:
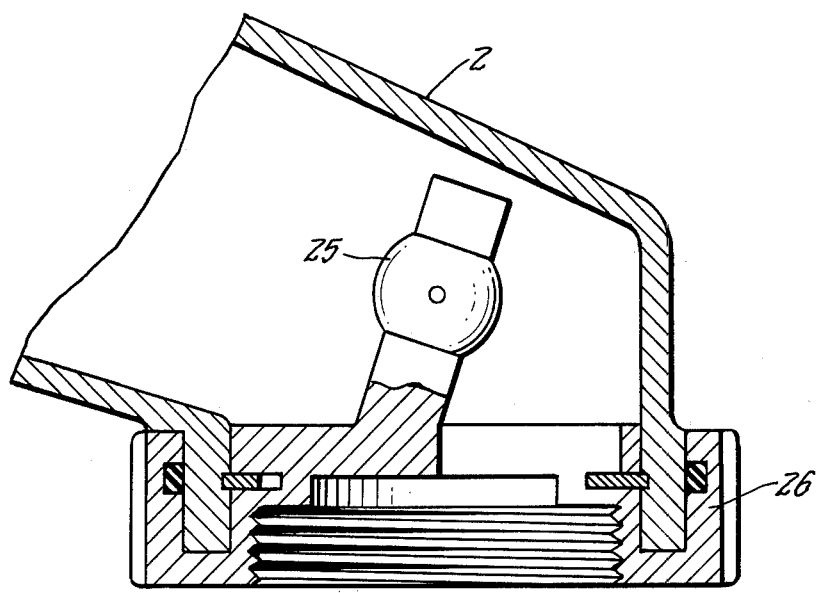
FIG. 4 is a cross-sectional view showing the other part of the device for transmitting a rotary motion in one plane to a similar motion in another plane.

With reference to the accompanying drawings, the mixer unit illustrated consists of a mixer housing 1 with a discharge spout 2. Situated in discharge spout 2 is a bimetal spiral 3 acting as a thermostat. This is constructed in a known manner from two spiralized flat wires bonded together, one of which in principle forms a spiral inside a spiral formed by the other. The former preferably has a greater longitudinal coefficient of expansion than the latter, whereby the end of the bimetal spiral 3 situated furthest out in the discharge spout 2 is fixed, the spiral rotates about its own axis of symmetry. Thereby the angle of rotation of a point on the spiral increases the further inwards in the discharge spout 2 this point is situated. A yoke 4 is attached to the inner end of the bimetal spiral 3. This yoke is rocked by the reciprocating rotary motion of the bimetal spiral. A ball stud 5 serves as a pivot point for the yoke 4. This ball stud consists of the lower end of a rising spindle 6 passing through the upper section of the mixer housing 1 and provided for control with a knob or the like which is not shown. By turning this control knob the spindle 6 is raised or lowered and with it the ball stud 5. In this way the flow through the mixer is regulated.

The yoke 4 actuates valves 7, 8 for hot and cold water respectively. These are of identical construction and consist of cylinders 9 in which pistons 10 can move. U-packings or cup packings 11, 12 are located between the cylinder walls and the pistons for sealing purposes, whereby the upper packings 12 are inverted in relation to the lower packings 11. Ring-shaped cavities 13 are thereby formed in the valves. Through narrow holes 14 arranged radially in the pistons 10, these cavities are in connection with the central axial drillings 15 in the pistons. From existing holes 16 in the lower ends of the pistons 10 which are of substantially smaller diameter than the drillings 15, the connection leads out into inlet ducts 17, 18 for hot and cold water respectively.

Operation of the mixer is such that water from the inlet ducts 17, 18 enters the cavities 13 where mains pressure prevails in the state of rest. When the spindle 6 is rotated by means of the control knob that is not shown, the spindle rises and with it the ball stud 5. This gives the yoke 4 a certain clearance and its ends, which are provided with rubber inserts 19 for sealing against the hemi-spherical crowns of the pistons 10, lift away from the piston crowns, thus exposing existing holes 20 which communicate with the drillings 15. The water pressure in the cavities 13 rapidly diminishes as water passes from them to the radial holes 14 in the pistons 10 and into the drillings 15 and from there through the holes 20 in the piston crowns and out into the mixer housing 1. The pressure in the inlet ducts 17, 18 then presses up the pistons 10 acting as valve cones from their seats 21. Since the pistons 10 are provided with machined grooves 22 in which the lower cup packings 11 of the valves 7, 8 are located, these packings accompany the pistons on their upward movement. Thereby outlet openings 23 in the walls of the valve cylinders 9 are exposed and hot or cold water respectively can pass into the mixer housing 1 and on to the discharge spout 2.

The bimetal spiral 3 situated in the discharge spout 2 senses the temperature of the mixed water. The positional locking device for the outer end of the bimetal spiral 3 is designed to permit adjustment of the desired temperature of the mixed water. For this purpose the spiral is fitted with a fork-shaped endpiece 24 in which a stud 25 with a ball shape is located. This stud 25 forms an obtuse angle with the axis of symmetry of the bimetal spiral 3 in a neutral position, i.e. the setting for handwarm water. Stud 25 is connected with a ring 26 consisting of two concentric sections. This ring acts as a temperature setting device and on turning it the angle between the stud 25 and the axis of symmetry of the bimetal spiral 3 is changed. The bimetal spiral is thereby turned by its fork-shaped end section 24. The spiral then senses the temperature of the mixed water and regulates the opening relationship between the valves 7, 8 for hot and cold water respectively in the matter described above.

To shut off the flow through the mixer spindle 6 is turned by means of the control knob not shown. The ball stud 5 is thereby lowered and the yoke 4 consequently presses down against the crowns of pistons 10 of the valves 7, 8. The rubber inserts 19 in the ends of the yoke 4 then block the holes 20 in the piston crowns. This has the effect of closing the slight flow which passes through the pistons the whole time when the valve is open and the volume of which is determined by the holes 16, preferably in nipples 27, in the lower ends of the pistons 10. When this flow has been shut off the pressure inside the drillings 15 in the pistons 10 rapidly builds up and through the radial holes 14 the pressure in the cavities 13 will attain the same level as that in the inlet lines 17, 18. Since the same pressure will prevail on both sides of the lower cup packings 11, a very slight force, exercised by the yoke 4, is required to close the valves. In consequence, it is here a matter of servo-assisted shut-off-valves for hot and cold water respectively.

If regulation of the opening relationship between the valves should require more force on larger mixers, several bimetal spirals can be mounted and connected in parallel with each other. In other respects, several of the other components can be modified within the concept of the invention as it is defined in the following claims.

What is claimed is:

1. A mixer unit with thermostat-controlled valves for mixing hot and cold liquid comprising a housing, valves for supplying hot and cold liquid to said housing, a yoke rockably mounted in the housing, the ends of which actuate the valves for hot and cold liquid respectively, said valves for hot and cold liquid comprising cylinders having outlet openings, pistons carried in said cylinders and sealed by means of cup packings, the position of said pistons within said cylinders being movable to a suitable position for a certain mixture relationship between the liquids, by rocking movement of said yoke, and a bimetal spiral control thermostat for causing said rocking movement of said yoke upon regulation of said thermostat.

2. A mixer unit with thermostat-controlled valves for mixing hot and cold liquid comprising a housing, valves for supplying hot and cold liquid to said housing, a yoke rockably mounted in the housing and the ends of said yoke actuating the valves for hot and cold liquid respectively, and a bimetal spiral control thermostat for causing rocking movement of said yoke upon regulation of said thermostat, said valves for hot and cold liquid comprising cylinders having outlet openings, pistons carried in said cylinders and sealed by means of cup packings, the position of said pistons within said cylinders being determined by the movement of the yoke to a suitable position for a certain mixture relationship between the liquids, said pistons being tubular and provided with first holes at the bottom ends thereof of substantially smaller diameter than the inside diameter of the pistons, and being provided with second holes at the top ends thereof of smaller diameter than said inside diameter, each piston having at least one radial hole for communication between its hollow center and an existing annular space between the piston and the surrounding cylinder.

3. The mixer unit according to claim 2 wherein the ends of the yoke intended for sealing against the top ends of the pistons are provided with rubber inserts.

4. The mixer unit according to claim 3 further comprising a mixing chamber in said housing which terminates in a discharge spout wherein said outlet openings in said valve cylinders discharge into said mixing chamber.

5. The mixer unit according to claim 4 wherein said control thermostat is located in the discharge spout.

6. The mixer unit according to claim 5, further comprising a ring rotatably carried at the mouth of the discharge spout, said ring being connected by a stud which is inclined by a varying amount as the ring turns to thereby move the control thermostat about its axis of symmetry.

* * * * *